United States Patent [19]

Ogasawara

[11] Patent Number: 4,508,143
[45] Date of Patent: Apr. 2, 1985

[54] DRAIN DISCHARGING APPARATUS

[75] Inventor: Yoshinari Ogasawara, Aichi, Japan

[73] Assignee: CKD Corporation, Aichi, Japan

[21] Appl. No.: 431,079

[22] Filed: Sep. 30, 1982

[30] Foreign Application Priority Data

Oct. 28, 1981 [JP] Japan ................................ 56-172607

[51] Int. Cl.³ ..................... F16K 31/05; F16K 31/524
[52] U.S. Cl. ................................... 137/636.1; 137/559;
222/448; 222/447; 222/450; 251/263; 251/251
[58] Field of Search ................. 137/559, 636.1, 627.5;
222/158, 159, 447, 448, 449, 450, 453; 251/251,
263, 129, 133, 14

[56] References Cited

U.S. PATENT DOCUMENTS

| 1,160,484 | 11/1915 | Wright | 251/263 |
| 2,075,600 | 3/1937 | Baker | 137/636.1 |
| 2,301,439 | 11/1942 | Moen | 137/636.1 |
| 2,452,295 | 10/1948 | Elliott | 137/636.1 |
| 2,567,892 | 9/1951 | Osterman | 137/559 |
| 2,616,710 | 11/1952 | Woodruff | 137/636.1 |
| 2,619,106 | 11/1952 | Wilkerson . | |
| 2,619,985 | 12/1952 | Wilkerson . | |
| 2,636,571 | 4/1953 | Churchman . | |
| 2,662,551 | 12/1953 | Wilkerson . | |
| 2,677,386 | 5/1954 | Wilkerson . | |
| 2,816,564 | 12/1957 | Wilkerson . | |
| 2,819,799 | 1/1958 | Wilkerson . | |
| 2,869,570 | 1/1959 | Wilkerson . | |
| 3,151,783 | 10/1964 | Shaw et al. | 222/447 |
| 3,152,785 | 10/1964 | Zeitlin | 251/251 |
| 3,340,890 | 9/1967 | Raskhodoff | 137/559 |
| 3,403,700 | 10/1968 | Meynell | 137/636.1 |

FOREIGN PATENT DOCUMENTS 1445085 8/1976 United Kingdom ............. 137/636.1

OTHER PUBLICATIONS

"Pallmatic", attached FIG. 1, Pall Trinity Micro Crp. (Cortland, N.Y. U.S.A.).

Primary Examiner—George L. Walton
Attorney, Agent, or Firm—Wenderoth, Lind & Ponack

[57] ABSTRACT

A drain discharging apparatus capable of automatically discharging drain in compressed air, comprises a body formed therein with a drain reservoir chamber for receiving the drain and compressed air and with an inlet port and an outlet port both communicated with the drain reservoir chamber. A pair of poppet valves selectively communicate the drain reservoir chamber with the inlet port or the outlet port. A cam rotatable within the reservoir chamber alternately opens the poppet valves. A motor rotates the cam, which also is manually operable.

2 Claims, 9 Drawing Figures

DRAIN DISCHARGING APPARATUS

BACKGROUND OF THE INVENTION

Conventional valves for automatically discharging drain or drainage in compressed air include float type, air pilot type, and motor type valves, among which the motor type is the most reliable in discharging the drain. The conventional drain discharging apparatus of the motor type has a fixed or variable drain discharging cycle or drain discharging period. In the fixed period type, the drain discharging period must be selected to drain the largest probable quantity of the drain to be discharged. Accordingly, in the winter season when the quantity of drain is the smallest, a relative large quantity of purge air is discharged, thus unduly increasing the air loss. In a small air pressure system, a drop in pressure is caused thereby.

In the variable type which is adjustable according to the quantity of the drain produced, the drain discharging period is usually set somewhat longer so as to ensure discharge of the drain and, accordingly, the apparatus is complicated in construction.

Further, absence of an indicator to check the operating condition of the apparatus from the outside is a cause of uncertainty.

SUMMARY OF THE INVENTION

The present invention relates to a drain discharging apparatus for discharging drain or drainage such as water in compressed air.

A principal object of the present invention is to provide a drain discharging apparatus which consumes only a small amount of compressed air and is easy to handle.

Another object of the present invention is to provide a drain discharging apparatus having a pair of drain discharging valves which are disposed respectively in an inlet port and in an outlet port communicated with a drain reservoir chamber and which are opened or closed by a cam rotated by a motor.

In the drain discharging apparatus according to the present invention of the construction having two drain discharging valves for discharging the drain and the compressed air only of the volume thereof collected in the drain reservoir chamber, it is possible to minimize air loss. Further, since the drain discharging apparatus according to the present invention is of such construction that air is not blown through it, it is not necessary to establish precisely the ratio of angle of the land and the groove of the cam for opening and closing the valves or to limit the drain discharging period extremely severely, thereby making the manufacture of the cam very easy. Further, in the drain discharging apparatus according to the present invention, since there is no blowing out of air when the motor is stopped randomly, it is not necessary to control the stopping position of the output shaft of the motor.

A further object of the present invention is to provide a drain discharging apparatus capable of discharging drain easily by a manually operated mechanism which is simple in construction and operation.

A still further object of the present invention is to provide a drain discharging apparatus having an indicator whereby the operating condition of the apparatus easily can be checked from the outside.

BRIEF DESCRIPTION OF THE DRAWINGS

The invention will be better understood from the following description taken in connection with the accompanying drawings in which.

DESCRIPTION OF THE PREFERRED EMBODIMENTS

Figure 1:
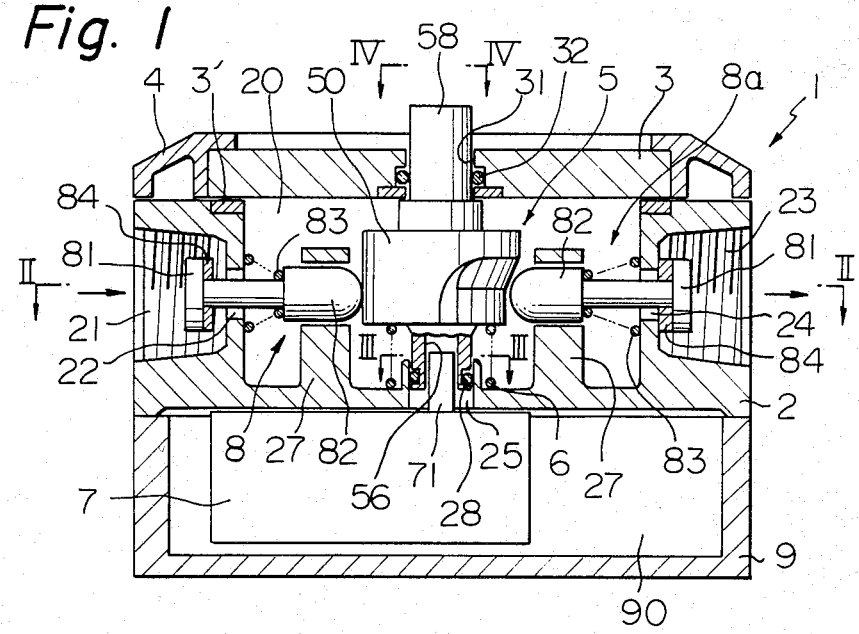
FIG. 1 is a vertical sectional view of an embodiment of the drain discharging apparatus according to the present invention.

With reference now to the drawings, an embodiment of the drain discharging apparatus according to the present invention will be described in detail.

In FIGS. 1 to 5, the drain discharging apparatus 1 includes a body 2 formed therein with a drain reservoir chamber 20 open at an end (the upper end in FIG. 1) thereof, an inlet port 21 and an outlet port 23 communicated with the drain reservoir chamber 20 through valve ports 22 and 24, respectively, and a bearing bore 25. On the top of the body, there is disposed a cover 3 to cover the drain reservoir chamber 20. The cover 3 is fixed to the body 2 by means of a fitting member 4 which is fixed to the body 2 by suitable means such as set screws (not shown). The cover 3 is preferably but not necessarily made of a transparent material so as to allow the inside of the drain reservoir chamber 20 to be seen from the outside.

Within the drain reservoir chamber 20, there is disposed a cam shaft 5 having journals 58 thereof rotatably and axially movably received in the bearing bore 25 of the body 2 and a bearing bore 31 of the cover 3. The cam shaft 5 is formed in the middle thereof with a cam 50. The cam 50 is, as clearly shown in FIGS. 1 and 5, formed with a land 51 and a groove 52 extending substantially over a semicircle on one side (lower side in FIG. 5) with respect to the axial direction thereof, while the whole circle thereof on the upper side constitutes a land 53 co-radial with the land 51. The lands 51 and 53 and the groove 52 are connected to each other through inclined surfaces 54 and 55.

The cam shaft 5 is urged normally toward the cover 3 by a spring 6 disposed between itself and the bottom wall of the drain reservoir chamber 20 and is movable toward the bottom of the drain reservoir chamber by depressing the top end thereof.

On the underside of the body 2, there is disposed a lower cover 9 fixed by suitable means such as set screws (not shown) to define a motor chamber 90. Within the motor chamber 90, there is fixed a means 7 for rotating the cam shaft 5. The means 7 is, in this embodiment, constituted by a motor with a reduction mechanism of a known construction. A drive shaft 71 of the motor 7 has a tip end thereof formed to have a polygonal section (for example, hexagon as shown in FIG. 3 or square as shown in FIG. 6) so as to be received into a corresponding polygonal bore 56 formed at the lower end of the cam shaft 5, whereby the rotation of the drive shaft 71 is transmitted to the cam shaft 5.

Figure 3:
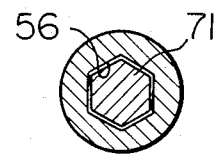
FIG. 3 is a sectional view taken along the line III—III of FIG. 1, showing the connection between the shaft of the cam and the shaft of the motor.
Figure 4:
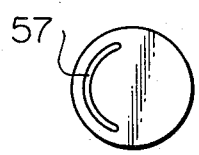
FIG. 4 is a view taken along the line IV—IV of FIG. 1, showing the indicator.
Figure 6:
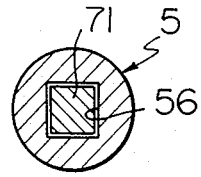
FIGS. 6 to 8 are views showing modifications of the construction for connection between the drive shaft of the motor and the cam shaft.
Figure 5:
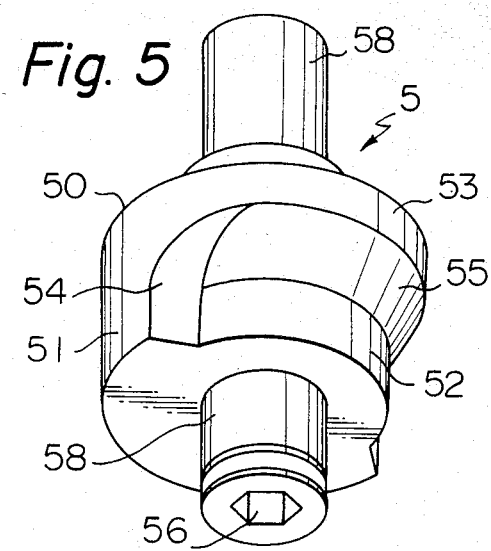
FIG. 5 is an enlarged perspective view of the cam shaft.
Figure 7:
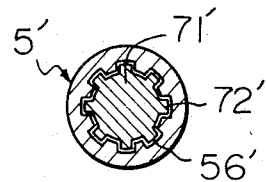
Figure 8:
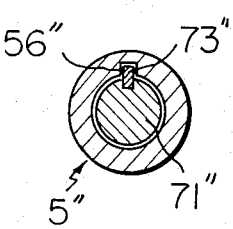

The cam shaft 5 and the drive shaft 71 of the motor 7 may be connected by, beside the constructions shown in FIGS. 3 and 6, the construction shown in FIG. 7 in which a drive shaft 71' is formed with splines 72' on the outer peripheral surface thereof while a bore 56' has corresponding splines therein, or the construction shown in FIG. 8 in which a drive shaft 71" is provided with a key 73" while a bore 56" of the cam shaft is formed therein with a corresponding key way.

The upper end of the cam shaft constitutes a push button for manual operation, so that the cam shaft 5 is pushed downward against the biasing force of the spring 6 by depressing the upper end face of journal 58 thereof. On the upper end face of journal 58, there is provided a mark 57 through which the direction of the land 51 (or the groove 52) of the cam 50 can be ascertained from the outside. The mark 57 constitutes an indicator by which the operating condition of the drain discharging apparatus can be ascertained from the outside.

Within the body 2, there are disposed a pair of drain discharging valves or poppet valves 8 and 8a for controlling the opening and closing of the valve ports 22 and 24, respectively. Each of the poppet valves 8 and 8a comprises a valve body 81 disposed within the inlet port 21 or the outlet port 23, a valve stem 82 extending through the valve port 22 or 23 and having the valve body 81 secured to an end thereof with the other end supported movably by a support member 27 formed integrally with the body 2, and a spring 83 normally urging the valve body 81 into the valve port closing position. The other end of the valve stem 82 on the side opposite to the valve body constitutes a cam follower in engagement with the cam. Elastic seal members 84 complete the sealing of the valve ports 22 and 24.

Within bore 31 of the cover 3, there is disposed an O-ring seal 32 for preventing the leakage of the compressed air and/or the drain from the drain reservoir chamber 20 through a gap between the bore 31 and the upper journal 58 of the cam shaft 5. On the outer peripheral surface of the lower journal 58 of the cam shaft 5 within the bearing bore 25 of the body 2, there is disposed an O-ring seal 28 for preventing the leakage of the compressed air and/or the drain from the drain reservoir chamber 20 into the motor chamber 90 through the gap between the lower bearing bore 25 and the journal 58 of the cam shaft 5.

Figure 2:
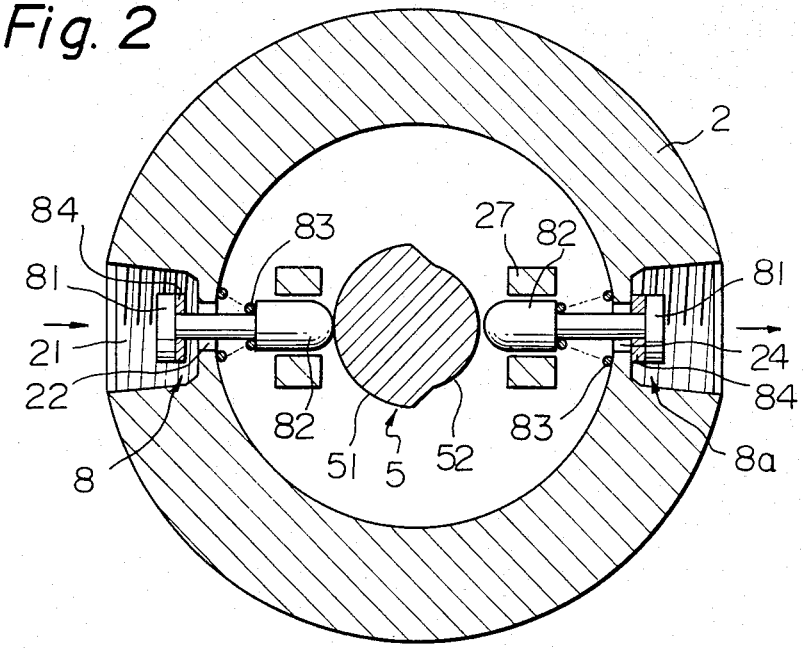
FIG. 2 is a horizontal sectional view taken along the line II—II of FIG. 1.

In the drain discharging apparatus having the above-described construction, when the land 51 of the cam 50 is in engagement with the valve stem 82 of the poppet valve 8, as seen clearly in FIG. 2, to push the valve body 81 to thereby open the valve port 22, the compressed air and the drain are allowed to enter the drain reservoir chamber 20 through the inlet port 21 and are collected therein.

Then, the motor 7 is operated to rotate the cam shaft 5 approximately 180° by the drive shaft 71 to thereby bring the land 51 of the cam 50 into engagement with the valve stem 82 of the poppet valve 8a, the valve stem 82 or cam follower of the poppet valve 8 is disengaged form the land 51 of the cam 50 into engagement with the groove 52 to thereby open the valve port 24 of the poppet valve 8a and close the valve port 22 of the poppet valve 8. Accordingly, the compressed air and the drain collected in the drain reservoir chamber 20 are discharged to the outside through the outlet port 23. At this time, since the air from the inlet port 21 is not allowed to flow into the drain reservoir chamber, the air discharged from the outlet port 23 is only that which has been collected in the drain reservoir chamber, to thereby minimize the loss of air.

In the case where the motor is not rotated owing to a stoppage of electric current or any other reason or in case of necessity, the valve ports 22 and 24 of the poppet valves 8 and 8a, respectively, can be simultaneously opened by hand by depressing an end (the upper end in the drawings) of the cam shaft, to thereby discharge not only the drain within the drain reservoir chamber but also the drain in an air tank or conduit connected with the inlet port 21. That is, when the cam shaft 5 is at the position shown in FIG. 1, the poppet valve 8 is opened and the poppet valve 8a is closed. At this condition, when the cam shaft 5 is pushed downward, the end of the valve stem or cam follower of the poppet valve 8a is brought into engagement with the land 53 of the cam 50 to open the poppet valve 8a while the valve stem of the poppet valve 8 remains in engagement with the land 51 even after the cam shaft 5 is pushed downward, to keep the poppet valve 8 open.

Figure 9:
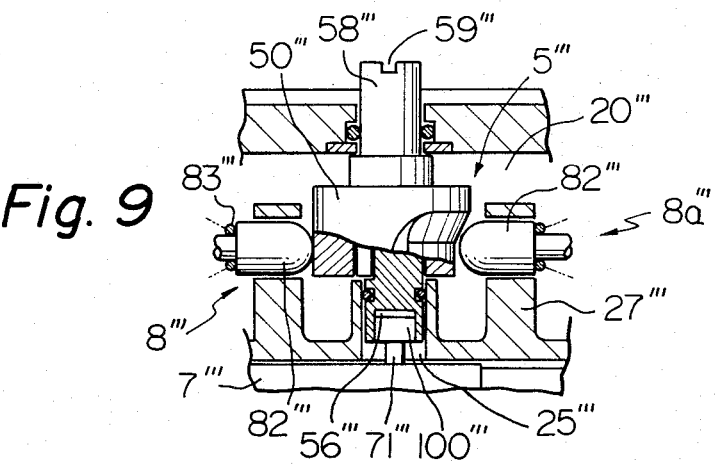
FIG. 9 is a view showing a modification of the mechanism for manually operating the cam shaft.

Another embodiment of the present invention is shown in FIG. 9, in which a journal 58''' of a cam shaft 5''' and a cam 50''' are formed separately but are fixed together by a key for rotation together. In this embodiment, on the upper end face of the journal 58''' there is formed a groove 59''' as a means for operating the cam shaft by hand. That is, a tip end of a screw driver is fitted into the groove 59''' and the cam shaft is rotated by rotating the screw driver. In this case, in order to make the cam shaft rotatable independently from the motor, a one-way clutch 100''' is disposed within a bore 56''' at the lower end of the journal 58''' so that a motor shaft 71''' and the cam shaft 5''' are connected to each other through said one-way clutch. This embodiment is identical in all other points of construction to the drain discharging apparatus shown in FIG. 1.

In this embodiment, by making the cam shaft 5''' rotatable by 180° it is possible to open poppet valves 8''' and 8a''' alternately to discharge only the drain and/or compressed air collected in the drain reservoir chamber 20''' by hand.

What is claimed is:

1. A drain discharging apparatus for automatically draining drainage from a compressed air source, said apparatus comprising:

a body having therein a drain reservoir chamber, an inlet port adapted to be connected to a source of compressed air and drainage, an outlet port adapted to be connected with a drain, and first and second valve ports respectively connecting said inlet and outlet ports to said chamber for respectively introducing compressed air and drainage from said inlet port into said chamber and discharging compressed air and drainage from said chamber through said outlet port, said valve ports opening into said chamber at an inner periphery thereof;

first and second poppet valves positioned in said body, each said valve including a valve body urged by a respective spring into a first position closing communication through a respective said valve port;

a cam mounted in said body for rotation about an axis;

said cam having first surface means for urging said valve bodies against said respective springs to second positions opening communication through said respective valve ports;

motor means for continuously rotating said cam about said axis such that said first surface means alternately moves said valve bodies of said first and second poppet valves from said first positions thereof to said second positions thereof without simultaneously moving both said valve bodies from said first positions thereof;

means for mounting said cam for movement with respect to said body along said axis;

spring means for urging said cam in a first axial direction to position said first surface means adjacent said valve bodies; and said cam having second surface means for, upon movement of said cam in a second axial direction against said spring means, moving one of said valve bodies which is in said first position thereof to said second position thereof, while maintaining at all times during said movement said first surface against the other said valve body in said second position to thereby open both of said poppet valves to discharge said compressed air and said drainage.

2. An apparatus as claimed in claim 1, wherein said cam includes a cam shaft having on an end thereof an indicator showing the relative said positions of said valve bodies.

* * * * *